(12) United States Patent
Koyama et al.

(10) Patent No.: US 12,742,718 B2
(45) **Date of Patent: *Sep. 22, 2026**

(54) GENERATED PARTICLE INSPECTION DEVICE AND INSPECTION METHOD THEREOF FOR PILLAR-SHAPED HONEYCOMB FILTER

(71) Applicant: NGK INSULATORS, LTD., Nagoya-City (JP)

(72) Inventors: Takakazu Koyama, Gifu (JP); Yuji Watanabe, Nagoya (JP); Hiroyoshi Inoue, Nagoya (JP); Takuya Yamada, Nagoya (JP)

(73) Assignee: NGK INSULATORS, LTD., Nagoya-City (JP)

( * ) Notice: Subject to any disclaimer, the term of this patent is extended or adjusted under 35 U.S.C. 154(b) by 259 days.

This patent is subject to a terminal disclaimer.

(21) Appl. No.: 18/396,937

(22) Filed: Dec. 27, 2023

(65) Prior Publication Data

US 2024/0255408 A1 Aug. 1, 2024

(30) Foreign Application Priority Data

Jan. 30, 2023 (JP) ................................ 2023-012200

(51) Int. Cl.
*G01N 15/08* (2006.01)

(52) U.S. Cl.
CPC ....... *G01N 15/08* (2013.01); *G01N 2015/084* (2013.01)

(58) Field of Classification Search
CPC ........... G01N 2015/084; G01N 15/082; G01N 15/0806; F24F 11/38; F24F 11/39; F24F 11/36; B01D 2273/18
See application file for complete search history.

(56) References Cited

U.S. PATENT DOCUMENTS 4,055,075 A * 10/1977 Allan ...................... G01M 3/00 96/417
RE31,952 E * 7/1985 Wilcox .................. B01D 46/58 96/417

(Continued)

FOREIGN PATENT DOCUMENTS

JP 6756939 B1 9/2020
JP 2020-165347 A 10/2020

(Continued)

OTHER PUBLICATIONS

Japanese Office Action (with English translation) dated Jul. 24, 2025 (Application No. 2023-012200).

*Primary Examiner* — Tran M. Tran
(74) *Attorney, Agent, or Firm* — Muncy, Geissler, Olds & Lowe, P.C.

(57) ABSTRACT

An inspection device for a pillar shaped honeycomb filter, wherein the inspection device includes: a housing portion; an introduction pipe and a discharge pipe, each of the introduction pipe and the discharge pipe being connected to the housing portion; a particle generation portion for generating particles; a particle introduction portion for introducing the particles generated by the particle generation portion into the introduction pipe; a gas stirring portion disposed in the introduction pipe on an upstream side of the particle introduction portion; a particle concentration adjusting portion disposed in the introduction pipe on a downstream side of the particle introduction portion; and particle counters for measuring the number of particles, the particle counters being disposed in the introduction pipe and the discharge pipe on the downstream side of the particle introduction portion.

20 Claims, 10 Drawing Sheets

(56) References Cited

U.S. PATENT DOCUMENTS 5,398,541 A * 3/1995 Hijikata .................. G01M 3/26 73/38
5,417,101 A * 5/1995 Weich .................. B01D 29/114 73/40
5,566,545 A * 10/1996 Hijikata ............. B01D 46/2451 60/311
5,836,520 A * 11/1998 Bhandarkar ........ H01L 21/4853 239/590.5
5,930,994 A * 8/1999 Shimato .................. F01N 3/031 60/311
7,012,678 B2 * 3/2006 Enomoto ............. B01D 65/102 356/337
7,186,286 B2 * 3/2007 Morse ....................... G01L 3/20 55/420
7,410,528 B2 * 8/2008 Rae ......................... F01N 11/00 73/40
7,704,293 B2 * 4/2010 Wang .................. B01F 25/4521 55/418.1
8,518,166 B2 * 8/2013 Tasi ................... B01D 46/4272 55/385.2
8,608,825 B2 * 12/2013 Morse .................. G01N 15/082 210/764
8,889,079 B2 * 11/2014 Zahedi ................. B01D 53/864 422/171
8,999,035 B2 * 4/2015 Morse ................ B01D 46/0091 210/764
9,032,719 B2 * 5/2015 Sun, Jr. ................ G01N 15/082 60/277
9,360,411 B2 * 6/2016 Woolard ................. G01M 3/04
10,006,848 B2 * 6/2018 Woolard ................. G01M 3/20
10,156,211 B1 * 12/2018 Martin .................. F01N 3/2093
10,180,384 B2 * 1/2019 Verma ..................... G21F 7/015
10,365,201 B2 * 7/2019 Miyairi .............. B01D 46/2484
11,098,628 B2 * 8/2021 Hirose .................... F01N 11/00
11,175,210 B2 * 11/2021 Berryessa .............. B64D 13/06
11,181,461 B2 * 11/2021 Huza .................. G01N 15/0826
11,237,074 B2 * 2/2022 Petersen ............ G01N 15/0806
11,278,921 B2 * 3/2022 Woolard ............... B05B 7/0075
11,293,317 B2 * 4/2022 Yoshioka ............... B01J 35/657
11,338,238 B2 * 5/2022 Mahler ..................... B05B 1/20
11,480,082 B2 * 10/2022 Wang ..................... B01D 46/62
11,662,294 B2 * 5/2023 Kaneko .............. G01N 15/0806 73/38
11,692,922 B2 * 7/2023 Huza ........................ F24F 11/39 73/38
11,841,308 B2 * 12/2023 Maguire-Boyle ............................ B01D 46/0086
11,860,079 B2 * 1/2024 Yue ......................... E21B 41/00
12,117,386 B2 * 10/2024 Kajiura .............. B01D 39/2079
12,449,345 B2 * 10/2025 Citriniti ............. G01N 15/1404
2002/0144535 A1 * 10/2002 Sakata ............... G01N 15/1456 73/1.03
2006/0070360 A1 * 4/2006 Sellers ................... B01D 46/68 55/303
2006/0151926 A1 * 7/2006 Zoeller ................. B28B 11/006 264/603
2007/0238191 A1 * 10/2007 Gargano ................ G01N 21/53 436/164
2008/0173071 A1 * 7/2008 Park ................. G01N 21/95692 73/38
2010/0218489 A1 * 9/2010 Harndorf ................ F01N 9/002 73/23.33
2011/0232362 A1 * 9/2011 Thiagarajan ....... B01D 46/0086 73/23.33
2013/0192344 A1 * 8/2013 Bryan ................... B05B 7/2494 239/311
2020/0254435 A1 8/2020 Wu et al.
2021/0302296 A1 9/2021 Sato et al.

FOREIGN PATENT DOCUMENTS

JP 7022241 B1 2/2022
JP 2023-000914 A 1/2023

* cited by examiner

GENERATED PARTICLE INSPECTION DEVICE AND INSPECTION METHOD THEREOF FOR PILLAR-SHAPED HONEYCOMB FILTER

CROSS REFERENCE TO RELATED APPLICATIONS

The present invention claims the benefit of priority to Japanese Patent Application No 2023-012200 filed on Jan. 30, 2023 with the Japanese Patent Office, the entire contents of which are incorporated herein by reference in its entirety.

FIELD OF THE INVENTION

The present invention relates to an inspection device and an inspection method for a pillar shaped honeycomb filter.

BACKGROUND OF THE INVENTION

Particulate matters such as soot (hereinafter referred to as PMs: Particulate Matters) are contained in an exhaust gas discharged from an internal combustion engine such as diesel engines and gasoline engines. The PMs such as soot are harmful to the human body and emission of the PMs is regulated. Currently, filters represented by diesel particulate filters (DPFs) and gasoline particulate filters (GPFs) for passing an exhaust gas through a small porous partition wall to filter the PMs such as soot, are widely used in order to comply with exhaust gas regulations.

Known as a filter for collecting the PMs such as soot is a wall flow type pillar shaped honeycomb structure (hereinafter, also referred to as a "pillar shaped honeycomb filter") including: a partition wall that defines a plurality of first cells and second cells each extending from a first end face to a second end face, wherein the first cells and the second cells are arranged to be adjacent to each other across the partition wall, and the first end face of each first cell and the second end face of each second cell are opened, and the second end face of each first cell and the first end face of each second cell are provided with a plugged portion.

In recent years, with tightening of exhaust gas regulations, stricter PM emission standards (PN regulation: Particulate Matter Number Regulation) have been introduced, and higher PM collection performance (PN collection efficiency) is required for filters.

A conventional inspection method is known which feeds soot particles having a median particle size of 300 nm to a filter, measures the number of soot particles before and after being fed to the filter by means of a particle counter, and determines a difference between them (Patent Literature 1). Further, also known is a method of feeding a gas containing fine particles to a first end face of a pillar shaped honeycomb filter, and irradiating a second end face with a sheet-like light parallel to the second end face so as to cover the entire second end face, and imaging the entire second end face with a camera (Patent Literature 2).

In the inspection method of Patent Literature 1, an amount of soot particles fed tends to change depending on positions in the filter. This is because, in the inspection method of Patent Literature 1, it difficult to stir the soot particles, so that the concentration distribution of the soot particles is deviated in a plane orthogonal to a feed direction of the soot particles. Therefore, even if the same product is inspected, the measured value may vary depending on the direction of the filter and the arrangement method, so that the inspection accuracy of the collection performance may be deteriorated.

Further, the inspection method of Patent Literature 2 simply evaluates the difference in brightness on the image based on the fact that the sheet-like light is scattered when it hits the fine particles. Therefore, it cannot be said that the inspection accuracy of the collection performance is sufficient.

Therefore, as described in Patent Literature 3, the applicant of this application proposed an inspection device for a pillar shaped honeycomb filter, the device including: a housing portion capable of housing a pillar shaped honeycomb filter; an introduction pipe and a discharge pipe through which a gas can flow, the introduction pipe and the discharge pipe being connected to the housing portion; a particle generation portion for generating particles; a particle introduction portion for introducing the particles generated in the particle generation portion into the introduction pipe; a gas stirring portion disposed in the introduction pipe on an upstream side of the particle introduction portion in a flow direction of the gas; and particle counters disposed in the introduction pipe and the discharge pipe on a downstream side of the particle introduction portion in the flow direction of the gas. The inspection device effectively stirs the particles with the gas stirring portion disposed at a predetermined position, and suppresses the unevenness of the particle concentration distribution in a plane perpendicular to the flow direction of the gas, so that the inspection accuracy of the collection performance can be improved.

When the diameter of the pillar shaped honeycomb filter to be inspected is large, the inspection device described in Patent Literature 3 requires an increase in the diameter of the introduction pipe connected to the housing portion for housing the pillar shaped honeycomb filter accordingly. However, if the diameter of the introduction pipe is increased, the inspection device becomes larger because the introduction pipe has to be made longer in order to suppress the deviation in the concentration distribution of the particles in the plane perpendicular to the flow direction of the gas.

Furthermore, even if the diameter of the pillar shaped honeycomb filter is not large, the inspection device for the pillar shaped honeycomb filter is relatively large (for example, the introduction pipe is long), so that there is a current situation where a space to be disposed is limited.

The present invention has been made to solve the above problems. An object of the present invention is to provide an inspection device which has higher inspection accuracy of collection performance and can be downsized. Also, an object of the present invention is to provide an inspection method for a pillar shaped honeycomb filter, which has higher inspection accuracy of collection performance and can be implemented in a compact environment.

PRIOR ART

Patent Literatures

[Patent Literature 1] U.S. patent Application Publication No. 2020/0254435 A1

[Patent Literature 2] Japanese Patent No. 6756939 B

[Patent Literature 3] Japanese Patent No. 7022241 B

SUMMARY OF THE INVENTION

The present inventors have found that the inspection accuracy of the collection performance can be improved by providing a particle concentration adjusting portion, in addition to the gas stirring portion, at a predetermined position of the inspection device for the pillar shaped honeycomb filter to suppress the deviation in the concentration distribution of the particles in a plane perpendicular to a flow direction of the gas without increasing the length of the introduction pipe, and they have complete the present invention.

Thus, the present invention is illustrated as follows:

[1]

An inspection device for a pillar shaped honeycomb filter, wherein the inspection device comprises:

a housing portion that can house a pillar shaped honeycomb filter;

an introduction pipe and a discharge pipe through which a gas can flow, each of the introduction pipe and the discharge pipe being connected to the housing portion;

a particle generation portion for generating particles;

a particle introduction portion for introducing the particles generated by the particle generation portion into the introduction pipe;

a gas stirring portion disposed in the introduction pipe on an upstream side of the particle introduction portion in a flow direction of the gas; and a particle concentration adjusting portion disposed in the introduction pipe on a downstream side of the particle introduction portion in the flow direction of the gas; and particle counters for measuring the number of particles, the particle counters being disposed in the introduction pipe and the discharge pipe on the downstream side of the particle introduction portion in the flow direction of the gas.

[2]

The inspection device for a pillar shaped honeycomb filter according to [1], wherein the particle concentration adjusting portion is a particle concentration adjusting plate having a pair of planes perpendicular to the flow direction of the gas and having a plurality of openings penetrating the pair of planes.

[3]

The inspection device for a pillar shaped honeycomb filter according to [2], wherein the openings of the particle concentration adjusting plate are provided in a region from a center of each of the planes to ⅘ of a diameter of each of the planes.

[4]

The inspection device for a pillar shaped honeycomb filter according to [2] or [3], wherein the particle concentration adjusting plate has an opening ratio of 30% or more.

[5]

The inspection device for a pillar shaped honeycomb filter according to any one of [2] to [4], wherein a diameter of each of the openings of the particle concentration adjusting plate is 10,000 to 200,000 times an average particle size of the particles.

[6]

The inspection device for a pillar shaped honeycomb filter according to any one of [1] to [5], wherein a distance between a downstream end portion of the introduction pipe and the particle introduction portion in the flow direction of the gas is 5 to 10 times the diameter of the introduction pipe.

[7]

The inspection device for a pillar shaped honeycomb filter according to any one of [1] to [6], wherein the introduction pipe has a diameter of 150 to 270 mm.

[8]

The inspection device for a pillar shaped honeycomb filter according to any one of [1] to [7], wherein a distance between the downstream end portion of the introduction pipe and the particle introduction portion in the flow direction of the gas is 1400 to 2600 mm.

[9]

The inspection device for a pillar shaped honeycomb filter according to any one of [1] to [8], wherein the pillar shaped honeycomb filter has a diameter of 90 to 356 mm.

[10]

The inspection device for a pillar shaped honeycomb filter according to any one of [1] to [9], wherein the gas stirring portion is a gas stirring plate having a pair of planes perpendicular to the flow direction of the gas and having a plurality of openings penetrating the pair of planes, wherein the openings of the gas stirring plate are provided in a region from an outer periphery of each of the planes to ½ of the diameter of each of the planes.

[11]

The inspection device for a pillar shaped honeycomb filter according to [10], wherein the gas stirring plate has an opening ratio of 5 to 50%.

[12]

The inspection device for a pillar shaped honeycomb filter according to any one of [1] to [11], further comprising a calculation unit for calculating a collection efficiency of the particles based on the number of particles measured by the particle counters disposed in the introduction pipe and the discharge pipe.

[13]

The inspection device for a pillar shaped honeycomb filter according to any one of [1] to [12], wherein the particles are one or more selected from soot particles, carbon particles, oil particles, NaCl particles, and resin particles.

[14]

An inspecting method for a pillar shaped honeycomb filter, wherein the method comprises:

a particle generation step of generating particles;

a particle introduction step of introducing the particles generated in the particle generation step into a gas stirred by a gas stirring portion;

a particle concentration adjusting step of adjusting a concentration of particles in the gas;

a particle feed step of feeding the gas having the adjusted concentration of the particles to the pillar shaped honeycomb filter; and a particle measurement step of measuring the number of particles in the gas on an upstream side and a downstream side of the pillar shaped honeycomb filter in a flow direction of the gas.

[15]

The inspection method for a pillar shaped honeycomb filter according to [14], wherein the particle concentration adjusting step is carried out by passing the gas having the introduced particles through a particle concentration adjusting plate having a pair of planes perpendicular to the flow direction of the gas and having a plurality of openings penetrating the pair of planes.

[16]

The inspection method for a pillar shaped honeycomb filter according to [15], wherein the openings of the particle concentration adjusting plate are provided in a region from a center of each of the planes to ⅘ of a diameter of each of the planes.

[17]

The inspection method for a pillar shaped honeycomb filter according to [15] or [16], wherein the particle concentration adjusting plate has an opening ratio of 30% or more.

[18]

The inspection method for a pillar shaped honeycomb filter according to any one of [15] to [17], wherein a diameter of each of the openings of the particle concentration adjusting plate is 10,000 to 200,000 times an average particle size of the particles.

[19]

The inspection method for a pillar shaped honeycomb filter according to any one of [14] to [18], further comprising a collection efficiency calculation step of calculating a collection efficiency of the particles from the number of the particles obtained in the particle measurement step.

[20]

The inspection method for a pillar shaped honeycomb filter according to any one of [14] to [19], wherein the particles are one or more selected from soot particles, carbon particles, oil particles, NaCl particles, and resin particles.

DETAILED DESCRIPTION OF THE INVENTION

Hereinafter, embodiments of the present invention will be specifically described with reference to the drawings. It is to understand that the present invention is not limited to the following embodiments, and those which have appropriately added changes, improvements and the like to the following embodiments based on knowledge of a person skilled in the art without departing from the spirit of the present invention fall within the scope of the present invention.

(1) Inspection Device for Pillar Shaped Honeycomb Filter

Figure 1:
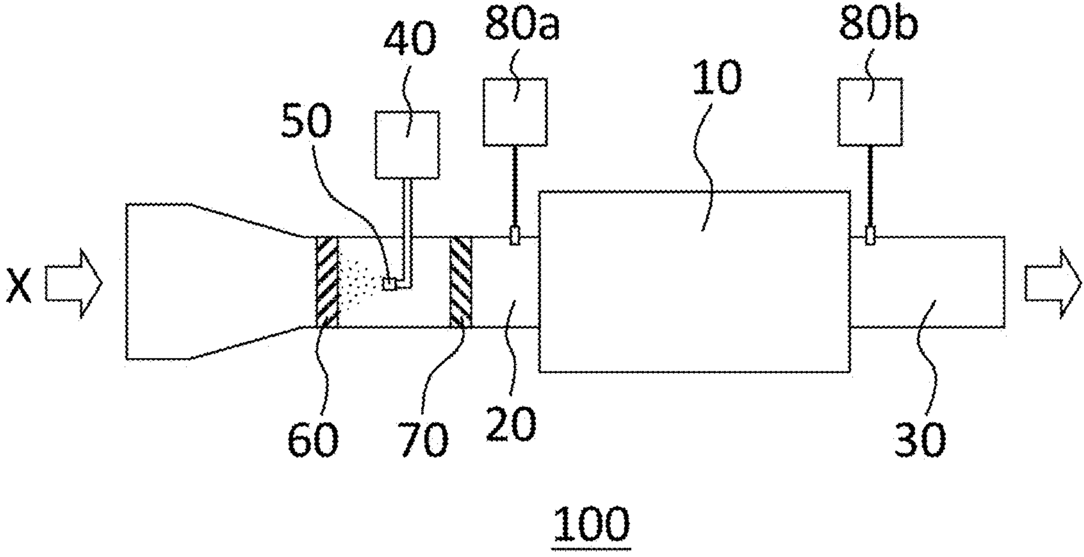
FIG. 1 is a schematic view of an inspection device for a pillar shaped honeycomb filter according to an embodiment of the present invention.

FIG. 1 is a schematic view of an inspection device for a pillar shaped honeycomb filter according to an embodiment of the present invention.

As shown in FIG. 1, an inspection device 100 for a pillar shaped honeycomb filter includes: a housing portion 10 that can house a pillar shaped honeycomb filter; an introduction pipe 20 and a discharge pipe 30 through which a gas can flow, and which are connected to the housing portion 10; a particle generation portion 40 for generating particles; a particle introduction portion 50 for introducing the particles generated by the particle generation portion 40 into the introduction pipe 20; a gas stirring portion 60 disposed in the introduction pipe 20 on an upstream side of the particle introduction portion 50 in a flow direction X of the gas; a particle concentration adjusting portion 60 disposed in the introduction pipe 20 on a downstream side of the particle introduction portion 50 in the flow direction X of the gas; and particle counters 80*a*, 80*b* which are respectively disposed in the introduction pipe 20 and the discharge pipe 30 on the downstream side of the particle introduction portion 50 in the flow direction X of the gas and which measure the number of particles.

The gas stirring portion 60 disposed on the upstream side of the particle introduction portion 50 has an effect of facilitating the diffusion of particles into the gas, but in order to stably ensure this effect, the length of the introduction pipe 20 should be set depending on the diameter of the introduction pipe 20. Therefore, for example, when the diameter of the introduction tube 20 is large, it is necessary to increase the length of the introduction pipe 20. However, by disposing the particle concentration adjusting portion 70 on the downstream side of the particle introduction portion 50, it is possible to adjust the concentration distribution of the particles in a plane perpendicular to the flow direction X of the gas without increasing the length of the introduction pipe 20. Therefore, the structure as described above leads to sufficient suppression of any deviation in the concentration distribution of the particles in the plane perpendicular to the flow direction X of the gas without increasing the length of the introduction pipe 20, so that the inspection device 100 can be downsized. Also, the number of the particles is measured by the particle counters 80*a*, 80*b* using the particles in which the deviation of the concentration distribution has been suppressed, so that inspection accuracy of collection performance can be improved.

It should be noted that FIG. 1 shows an example in which members such as the introduction pipe 20 and the discharge pipe 30 are horizontally arranged, but these members may be vertically arranged.

Hereinafter, each component of the pillar shaped honeycomb filter to be inspected and the inspection device 100 for the pillar shaped honeycomb filter will be described in detail.

<Pillar Shaped Honeycomb Filter 1>

The pillar shaped honeycomb filter used in the inspection device 100 for the pillar shaped honeycomb filter is a wall flow type pillar shaped honeycomb structure. The pillar shaped honeycomb filter can be used as DPF and GPF for collecting PMs such as soot, which are attached to an exhaust gas line from a combustion device, typically an engine mounted on a vehicle.

Figure 2:
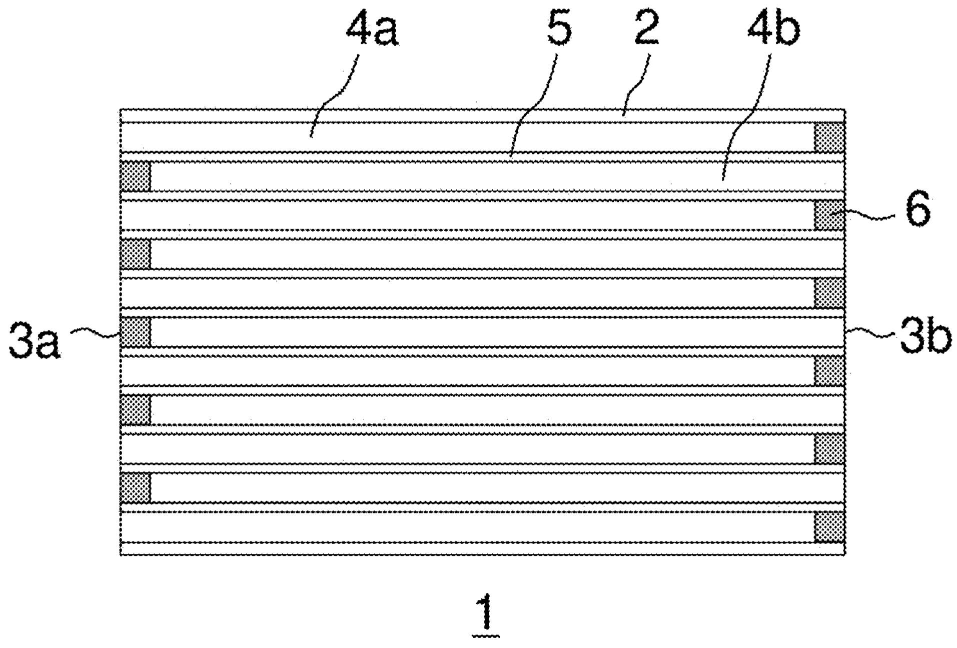
FIG. 2 is a cross-sectional view of a pillar shaped honeycomb filter used for an inspection device for a pillar shaped honeycomb filter according to an embodiment of the present invention.
Figure 3:
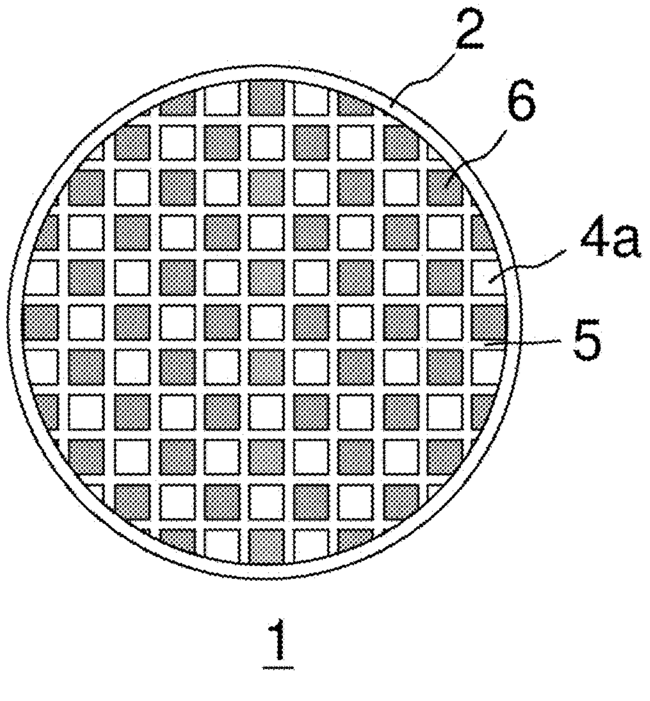
FIG. 3 is an end view of the pillar shaped honeycomb filter in FIG. 2.

FIGS. 2 and 3 are a schematic cross-sectional view (cross-sectional view parallel to an extending direction of cells) and an end view (end view of a first end face) of the pillar shaped honeycomb filter.

As shown in FIGS. 2 and 3, the pillar shaped honeycomb filter 1 includes: an outer peripheral wall 2; a plurality of first cells 4*a* disposed on an inner side of the outer peripheral wall 2, each of the first cells 4*a* extending from a first end face 3*a* to a second end face 3*b*, the first end face 3*a* being opened and the second end face 3*b* having a plugged portion 6; a plurality of second cells 4*b* disposed on the inner side of the outer peripheral wall 2, each of the second cells 4*b* extending from the first end face 3a to the second end face 3b, the first end face 3a having the plugged portion 6, and the second end face 3b being opened; and a porous partition wall 5 that defines the first cells 4a and the second cells 4b. Each of the first cells 4a and each of the second cells 4b are alternately arranged adjacent to each other across the partition wall 5, whereby each of the first end face 3a and the second end face 3b presents a honeycomb shape.

When an exhaust gas containing PMs such as soot is fed to the first end face 3a on an upstream side of the pillar shaped honeycomb filter 1, the exhaust gas is introduced into the first cells 4a and proceeds in the first cells 4a toward the downstream. Since the first cells 4a have the plugged portions 6 on the second end face 3b on the downstream side, the exhaust gas passes through the porous partition wall 5 separating the first cells 4a from the second cells 4b, and flows into the second cells 4b. Since the PMs cannot pass through the partition wall 5, they are collected and deposited in the first cells 4a. After the PMs are removed, the clean exhaust gas that has flowed into the second cells 4b proceeds in the second cells 4b toward the downstream and flows out from the second end face 3b on the downstream side.

Non-limiting Examples of materials for forming the pillar shaped honeycomb filter 1 include porous ceramics. The ceramics include cordierite, mullite, zirconium phosphate, aluminum titanate, silicon carbide, silicon-silicon carbide composites (e.g., Si-bonded SiC), cordierite-silicon carbide composites, zirconia, spinel, indialite, sapphirine, corundum, titania, silicon nitride and the like. These ceramics may be used alone or in combination of two or more kinds.

The pillar shaped honeycomb filter 1 may support a catalyst for assisting PM combustion on a surface of the partition wall 5 or inside the partition wall 5. Examples of the catalyst include precious metals (Pt, Pd, Rh, and the like), alkali metals (Li, Na, K, Cs, and the like), alkaline earth metals (Ca, Ba, Sr, and like), rare earths (Ce, Sm, Gd, Nd, Y, Zr, Ca, La, Pr, and the like), and transition metals (Mn, Fe, Co, Ni, Cu, Zn, Sc, Ti, V, Cr, and the like).

Examples of shapes of the end faces of the pillar shaped honeycomb structure include, but not limited to, round shapes such as a circular shape, an oval shape, a race track shape and an elliptical shape, and polygonal shapes such as a triangular shape and a quadrangular shape. The end face shape of the pillar shaped honeycomb filter 1 is the same as the cross-sectional shape orthogonal to the extending direction of the cells (first cells 4a and second cells 4b). It should be noted that the illustrated pillar shaped honeycomb filter 1 is an example in the case where the shapes of the end faces are circular and the outer shape is pillar shaped.

The diameter of the pillar shaped honeycomb filter 1 is preferably 90 to 356 mm, although not particularly limited thereto. When inspecting the collection performance of such a pillar shaped honeycomb filter 1 having the larger diameter, the conventional inspection device will have a longer introduction pipe so that the device is easily downsized, while the inspection device 100 for the pillar shaped honeycomb filter can be downsized because the length of the introduction pipe 20 does not need to be increased.

As used herein, the "diameter of the pillar shaped honeycomb filter 1" refers to a diameter (outer diameter) of the pillar shaped honeycomb filter 1 in a cross section perpendicular to the extending direction of the cells (first cells 4a and second cells 4b). When the cross-sectional shape of the pillar shaped honeycomb filter 1 is not circular, the diameter of the largest inscribed circle inscribed in the cross-sectional shape is defined as the diameter of the pillar shaped honeycomb filter 1.

Examples of shapes of the cells (the first cells 4a and the second cells 4b) in the cross section perpendicular to the flow path direction of the cells include, but not limited to, preferably a quadrangle, a hexagon, an octagon, or a combination thereof. Among them, a square and hexagon are more preferred. Such a cell shape results in a decreased pressure loss when the fluid is allowed to flow through the pillar shaped honeycomb filter 1.

A cell density (the number of cells per unit cross-sectional area) is not particularly limited, and it may be, for example, from 6 to 2000 cells/square inch (from 0.9 to 311 cells/$cm^2$), and preferably from 50 to 1000 cells/square inch (from 7.8 to 155 cells/$cm^2$), and even more preferably from 100 to 400 cells/square inch (from 15.5 to 62.0 cells/$cm^2$).

The pillar shaped honeycomb filter 1 can also be provided as an integrally formed product. The pillar shaped honeycomb filter 1 can also be provided as a segment joined body by joining and integrating outer side surfaces of a plurality of pillar shaped honeycomb segments each having the outer peripheral wall 2. By providing the pillar shaped honeycomb filter 1 as the segment joined body, thermal shock resistance can be increased.

The pillar shaped honeycomb filter 1 can be produced using a method known in the art. The method for producing the pillar shaped honeycomb filter 1 is described below as an example.

First, a raw material composition containing a ceramic raw material, a dispersion medium, a pore former and a binder is kneaded to form a green body. The green body is then extruded to form a desired pillar shaped honeycomb formed body. The raw material composition may optionally contain any additive such as a dispersant. In extrusion molding, a die having a desired overall shape, cell shape, partition wall thickness, cell density and the like can be used.

After the pillar shaped honeycomb formed body is dried, plugged portions (in an uncured state) are formed on both end faces of the pillar shaped honeycomb formed body, and the plugged portions (in an uncured state) are then dried to obtain a pillar shaped honeycomb formed body having the plugged portions (in a cured state). After that, the pillar shaped honeycomb formed body is subjected to degreasing and firing to produce a pillar shaped honeycomb filter 1.

The ceramic raw material that can be used herein includes a raw material capable of forming the above ceramics after firing. The ceramic raw material can be provided, for example, in the form of powder. Examples of the ceramic raw material include raw materials for obtaining ceramics such as cordierite, mullite, zircon, aluminum titanate, silicon carbide, silicon nitride, zirconia, spinel, indialite, sapphirine, corundum, and titania. Specific examples include, but not limited to, silica, talc, alumina, kaolin, serpentine, pyrophyllite, brucite, boehmite, mullite, magnesite, and aluminum hydroxide. The ceramic raw material may be used alone or in combination of two or more types.

For filter applications such as DPFs and GPFs, cordierite can be preferably used as the ceramic. In this case, a cordierite-forming raw material can be used as the ceramic raw material. The cordierite-forming raw material is a raw material that will form cordierite by firing. The cordierite-forming raw material is preferably composed of a chemical composition having 30 to 45% by mass of alumina ($Al_2O_3$) (including an amount of aluminum hydroxide converted to alumina), 11 to 17% by mass of magnesia (MgO), and 42 to 57% by mass of silica ($SiO_2$).

Examples of the dispersion medium include water or a mixed solvent of water and an organic solvent such as alcohol. The water can be more preferably used.

The pore former is not particularly limited as long as it forms pores after firing. Examples include wheat flour, starch, foaming resins, water-absorbing resins, porous silica, carbon (e.g., graphite), ceramic balloons, polyethylene, polystyrene, polypropylene, nylon, polyester, acrylics and phenols. The pore former may be used alone or in combination with two or more types. From the viewpoint of increasing the porosity of the fired body, the content of the pore former is preferably 0.5 parts by mass or more, and more preferably 2 parts by mass or more, and even more preferably 3 parts by mass or more, based on 100 parts by mass of the ceramic raw material. From the viewpoint of ensuring the strength of the fired body, the content of the pore former is preferably 10 parts by mass or less, and more preferably 7 parts by mass or less, and even more preferably 4 parts by mass or less, based on 100 parts by mass of the ceramic raw material.

Examples of the binder include organic binders such as methyl cellulose, hydroxypropyl methyl cellulose, hydroxyethyl cellulose, carboxymethyl cellulose, and polyvinyl alcohol. Among them, it is preferable to use methyl cellulose in combination with hydroxypropyl methyl cellulose. Further, the content of the binder is preferably 4 parts by mass or more, and more preferably 5 parts by mass or more, and 6 parts by mass, based on 100 parts by mass of the ceramic raw material, in terms of increasing the strength of the honeycomb formed body. The content of the binder is preferably 9 parts by mass or less, and more preferably 8 parts by mass or less, and even more preferably 7 parts by mass or less, based on 100 parts by mass of the ceramic raw material, in terms of suppressing cracking due to abnormal heat generation in the firing step. The binder may be used alone or in combination with two or more types.

The dispersant that can be used includes ethylene glycol, dextrin, fatty acid soaps, polyether polyol and the like. The dispersant may be used alone or in combination with two or more types. The content of the dispersant is preferably from 0 to 2 parts by mass based on 100 parts by mass of the ceramic raw material.

The method for plugging the end faces of the pillar shaped honeycomb formed body is not particularly limited, and a well-known method can be employed. Materials of the plugged portions 6 are not particularly limited. Ceramics are preferable in terms of strength and heat resistance. The ceramics are preferably a ceramic material containing at least one selected from the group consisting of cordierite, mullite, zircon, aluminum titanate, silicon carbide, silicon nitride, zirconia, spinel, indialite, sapphirine, corundum, and titania. Even more preferably, the plugged portions 6 have the same material composition as that of a main body portion of the honeycomb formed body, because it can provide the same expansion coefficient during firing, leading to improved durability.

After drying the honeycomb formed body, degreasing and firing can be carried out to produce the pillar shaped honeycomb filter. For conditions of the drying step, the degreasing step, and the firing step, known conditions may be used according to the material composition of the honeycomb formed body, and no specific explanation is required. However, specific examples of the conditions are given below.

In the drying step, conventionally known drying methods such as hot air drying, microwave drying, dielectric drying, drying under reduced pressure, vacuum drying, and freeze drying can be used. Among them, a drying method that combines the hot air drying and microwave drying or dielectric drying is preferable in that the entire formed product can be quickly and uniformly dried. When forming the plugged portions 6, it is preferable to form the plugged portions (in an uncured state) on both end faces of the dried honeycomb formed body and then dry the plugged portions (in an uncured state).

Next, the degreasing step will be described. A combustion temperature of the binder is about 200° C., and a combustion temperature of the pore former is about from 300 to 1000° C. Therefore, the degreasing step may be carried out by heating the honeycomb formed boy at a temperature in a range of from about 200 to 1000° C. A heating time is not particularly limited. It is generally about from 10 to 100 hours. The honeycomb formed body after the degreasing step is referred to as a calcined body.

Depends on the material composition of the honeycomb formed body, the firing step can be carried out, for example, by heating the calcined body to 1350 to 1600° C. and holding it for 3 to 10 hours.

The fired honeycomb formed body may be used as it is as a filter, or porous films for collecting PMs may be separately formed on the partition wall 5 in order to improve the PN collection efficiency. Any known method can be employed as the method for forming the porous films. In an embodiment, the porous film can contain, in total, 50% by mass or more of one or more selected from silicon carbide, cordierite, alumina, silica, mullite and aluminum titanate.

<Housing Portion 10>

The housing portion 10 is a member that can house the pillar shaped honeycomb filter 1.

The shape of the housing portion 10 is not particularly limited, but it may be appropriately set according to the shape of the pillar shaped honeycomb filter 1. For example, when the outer shape of the pillar shaped honeycomb filter 1 is cylindrical, the housing portion 10 can be cylindrical.

In the housing portion 10, the pillar shaped honeycomb filter 1 is housed so that the first end face **3*a* faces the introduction pipe 20 side and the second end surface 3*b* faces the discharge pipe 30** side.

Examples of the material used for the housing portion 10 include metals, ceramics, and the like. Examples of the metals include stainless steel, titanium alloys, copper alloys, aluminum alloys, brass and the like. The material of the housing portion 10 is preferably stainless steel because of its high durability and reliability.

<Introduction Pipe 20 and Discharge Pipe 30>

The introduction pipe 20 and the discharge pipe 30 are members through which a gas can flow, and which are connected to the housing portion 10. The introduction pipe 20 is located on the upstream side of the housing portion 10 in the flow direction X of the gas. Further, the discharge pipe 30 is located on the downstream side of the housing portion 10 in the flow direction X of the gas.

The shapes of the introduction pipe 20 and the discharge pipe 30 are not particularly limited. Each of them may have a cylindrical shape in which a cross section perpendicular to the flow direction X of the gas is circular; a rectangular cylindrical shape in which the cross section is triangular, quadrangular, pentagonal, or a hexagonal; and an elliptical cylindrical shape in which the cross section is elliptical. Among them, the introduction pipe 20 and the discharge pipe 30 are preferably cylindrical.

The diameter of the introduction pipe 20 is preferably 150 to 270 mm, although not particularly limited thereto. The introduction pipe 20 having the diameter within such a range is suitable for the inspection device 100 for the pillar shaped honeycomb filter 1 used in DPFs and GPFs having various sizes.

The diameter of the discharge pipe 30 is not particularly limited, but it may be the same diameter as that of the introduction pipe 20.

As used herein, "the diameter of the introduction pipe 20 and the diameter of the discharge pipe 30" mean the diameters (inner diameters) of the introduction pipe 20 and the discharge pipe 30 in the cross section perpendicular to the flow direction X of the gas. When the cross-sectional shapes of the introduction pipe 20 and the discharge pipe 30 are not circular, each diameter (inner diameter) of the largest inscribed circle inscribed in the cross-sectional shape is defined as the diameter of each of the introduction pipe 20 and the discharge pipe 30.

For the introduction pipe 20 and the discharge pipe 30, a part of each of them may have an increased and/or decreased diameter. Such a structure can lead to easy connection to other members or easy arrangement of other members, for example. When increasing and/or decreasing the diameter of a part of the introduction pipe 20, the diameter of the introduction pipe 20 on the downstream side of the gas stirring portion 60 in the flow direction X of the gas is made the same, and the diameters of the other portions are preferably increased and/or decreased.

Examples of the materials used for the introduction pipe 20 and the discharge pipe 30 include metals, ceramics, and the like. Examples of the metals include stainless steel, titanium alloys, copper alloys, aluminum alloys, brass and the like. The materials of the introduction pipe 20 and the discharge pipe 30 are preferably stainless steel because of its high durability and reliability.

<Particle Generation Portion 40>

The particle generation portion 40 is a portion that generates particles to be introduced into the pillar shaped honeycomb filter 1. The particle generation portion 40 can generate a gas containing particles. Example of the gas in the gas containing particles include, but not particularly limited to, air, nitrogen, helium, hydrogen, argon, and the like. Among them, the air is particularly preferable from the viewpoint of cost and safety.

The particles generated by the particle generation portion 40 include, but not limited to, soot particles, carbon particles, oil particles such as DEHS (bis (2-ethylhexyl) sebacate) particles, NaCl particles, and resin particles such as polystyrene latex particles. These can be used alone or in combination of two or more. It should be noted that when performing the total inspection for the pillar shaped honeycomb filter 1, the particles remain in the pillar shaped honeycomb filter 1 after the inspection, so that it is desirable to perform a removal process (for example, a heat process) of the particles. In particular, since the particles such as soot particles and carbon particles change the color of the pillar shaped honeycomb filter 1 to black color, the particles should be reliably removed by the heat process. However, the heat process will increase the costs, and may damage the pillar shaped honeycomb filter 1 depending on the conditions. Therefore, when performing the total inspection of the pillar shaped honeycomb filter 1, it is preferable to select and use the particles that are easy to be removed (for example, DEHS particles, resin particles, etc.).

A device capable of generating the particles as described above is commercially available. Therefore, the commercially available device can be used as the particle generation portion 40.

The particle generation portion 40 is not particularly limited, and for example, a soot particle generator capable of generating soot particles can be used. The soot particle generator is connected to, for example, a propane source, a nitrogen source and an air source, and can generate soot particles by incomplete combustion of propane.

The inspection accuracy can be improved by a particle size distribution of the particles generated by the particle generation portion 40, which is closer to the particle size distribution of the PMs contained in the actual exhaust gas. For example, a median diameter D50 (hereinafter, the median diameter 50 is referred to as an "average particle diameter") based on the number of PMs contained in the automobile exhaust gas is from 50 to 100 nm in a cumulative particle size distribution obtained by an electrostatic particle classifier and an agglomerated particle counter, and the like. Therefore, it is ideal that the average particle diameter of the particles generated by the particle generation portion 40 is also in that range. However, even if the particles have a particle size distribution different from that of the PMs contained in the actual exhaust gas, those particles can also be used because the collection mechanism is identical up to about 1000 nm.

The collection of the particles is mainly classified into the following four types:

(I) diffusion (collected by movement different from the flow due to the Brownian motion of particles);

(II) interruption (corrected by physical contact even if particles are carried by the flow);

(III) sedimentation (large particles deviate from the flow due to gravity and cannot pass through); and (IV) inertia (large particles are collected without being carried in the flow even if the flow direction changes).

For particles having a particle diameter up to about 1000 nm, the diffusion and interruption are dominant, so that the use of particles having a lower particle diameter can allow the actual collection performance to be simulated.

Therefore, the average particle diameter of the particles generated by the particle generation portion 40 is preferably from 100 to 1000 nm. By controlling the average particle diameter of the particles to such a range, the inspection accuracy of the collection performance can be stably improved.

Further, in the case of the inspection of the collection performance of the pillar shaped honeycomb filter 1 having a general collection ability, the average particle diameter of the particles may be in the above range. However, in the case of the inspecting of the collection performance of the pillar shaped honeycomb filter 1 having a higher collection ability, an average particle diameter of 300 nm or more results in substantially the same inspection result, so that it is difficult to obtain details of the collection performance. Therefore, in such a case, the average particle diameter of the particles is preferably 30 nm or more and less than 300 nm, and more preferably from 100 to 250 nm. By controlling the average particle diameter of the particles to such a range, the details of the collecting performance can be obtained even if the pillar shaped honeycomb filter 1 having a higher collecting ability is inspected, so that the inspection accuracy of the collecting performance can be improved.

<Particle Introduction Portion 50>

The particle introduction portion 50 is a portion that introduces the particles generated by the particle generation portion 40 into the introduction pipe 20. The particle introduction portion 50 and the particle generation portion 40 can be connected by using a tubular member such as a tube.

The particle introduction portion 50 is not particularly limited, but it is preferable to use a sprayer from the viewpoint of uniformly introducing the particles into the introduction pipe 20.

Figure 4:
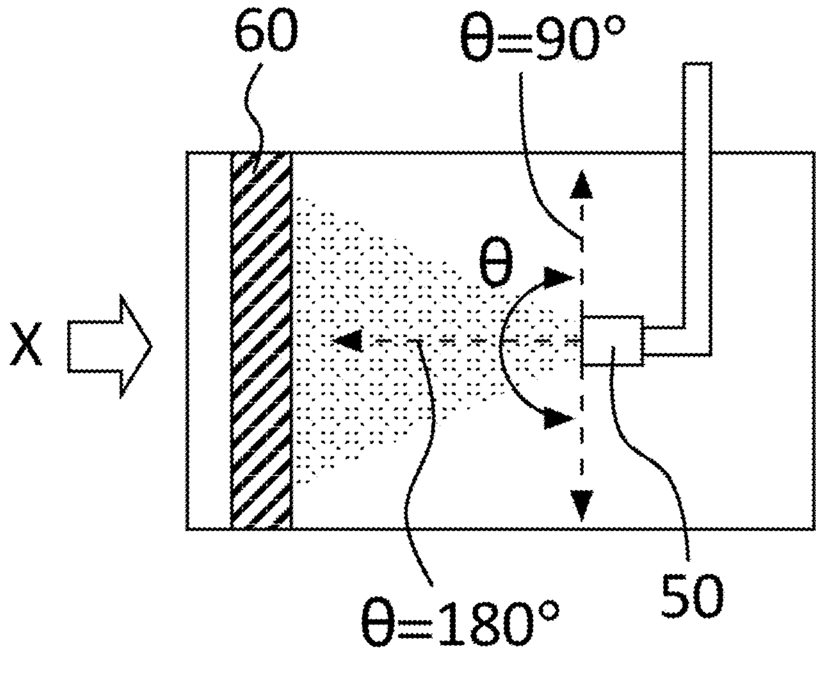
FIG. 4 is an enlarged view of the periphery of the particle introduction portion in FIG. 1.

As shown in FIG. 4, a direction of the particles introduced into the particle introduction portion 50 preferably has an angle θ of more than 90°, and more preferably an angle θ of from 100 to 180°, and still more preferably an angle θ of from 150 to 180°, and particularly preferably an angle θ of 180°, relative to the flow direction X of the gas. It should be noted that FIG. 4 is an enlarged view of the periphery of the particle introduction portion 50 shown in FIG. 1. By thus controlling the introduction direction of the particles, the particles are more easily diffused into the gas, so that an effect of suppressing the deviation of the concentration distribution of the particles in the plane perpendicular to the flow direction X of the gas can be enhanced. The number of the particles is measured by the particle counters 80*a*, 80*b* using the particles in which the deviation of the concentration distribution has been suppressed, so that the inspection accuracy of the collection performance can be further improved.

The particle introduction portion 50 preferably has a particle discharge port at a position facing the flow direction X of the gas, and more preferably it has a particle discharge port at a position opposing to the flow direction X of the gas. By providing the discharge port at such a position, the particles can be introduced so as to have an angle θ of more than 90° relative to the flow direction X of the gas.

Various conditions such as an amount and a rate of particles introduced in the particle introduction portion 50 may be appropriately set depending on the type of the particle introduction portion 50, the size of the introduction pipe 20, and the like, and are not particularly limited.

<Gas Stirring Portion 60>

A gas stirring portion 60 is a member having a function of stirring a gas. The gas stirring portion 60 is arranged in the introduction pipe 20 on the upstream side of the particle introduction portion 50 in the flow direction X of the gas.

The gas stirring portion 60 is not particularly limited, but it may preferably be a gas stirring plate.

Figure 5:
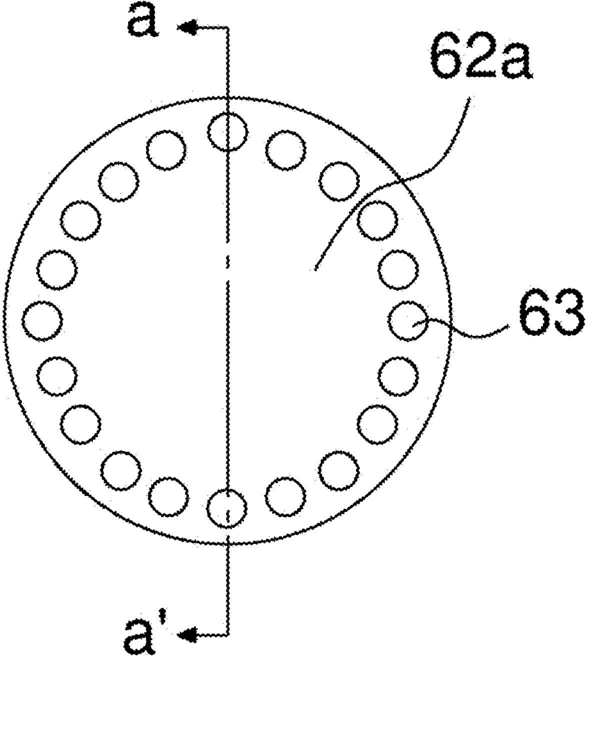
FIG. 5 is a plane view of a gas stirring plate used in an inspection device for a pillar shaped honeycomb filter according to an embodiment of the present invention.

Here, a plane view of a typical gas stirring plate (a plane view seen from the upstream side of the flow direction X of the gas) is shown in FIG. 5. Further, a cross-sectional view taken along the line a-a' in FIG. 5 is shown in FIG. 6.

Figure 6:
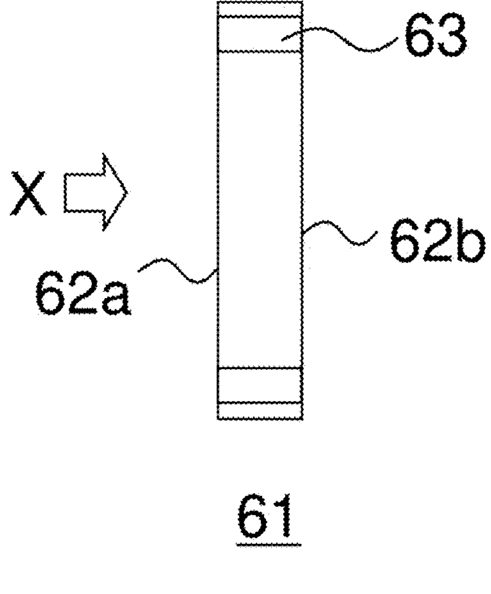
FIG. 6 is a cross-sectional view taken along the line a-a' of the gas stirring plate in FIG. 5.

As shown in FIGS. 5 and 6, the gas stirring plate 61 has a pair of planes 62*a*, 62*b* perpendicular to the flow direction X of the gas, and has a plurality of openings 63 penetrating the pair of planes 62*a*, 62*b*. The openings 63 of the gas stirring plate 61 are arranged from the outer periphery of the pair of flat surfaces 62*a*, 62*b* to ½, preferably ⅖, more preferably 3/10, of the diameter of each of the pair of flat surfaces 62*a*, 62*b*.

The use of the gas stirring plate 61 having the above structure leads to a negative pressure on a slip stream side (plane 62*b* side) of the gas stirring plate 61 by using the gas stirring plate 61 as the gas stirring portion 60, resulting in a backflow of the gas to form a recirculation flow. In particular, by arranging the plurality of openings 63 in the outer peripheral region of the gas stirring plate 61, the recirculation flow tends to be formed on the downstream side of the gas stirring plate 61. By introducing the particles from the particle introduction portion 50 into that portion, the particles are diffused into the gas while being involved in the recirculation flow, so that the deviation of the concentration distribution of the particles in the plane perpendicular to the flow direction X of the gas is suppressed. As a result, the particles can be uniformly fed to the pillar shaped honeycomb filter 1 to be inspected. Further, the gas stirring plate 61 has a simpler structure than that of a stirring device having a rotary blade mechanism and does not require any external electric power, so that various costs can be suppressed.

In the gas stirring plate 61, the opening ratio is preferably from 5 to 50%, and more preferably from 10 to 40%. By controlling the opening ratio to such a range, the recirculation flow is easily formed on the slip stream side of the gas stirring plate 61, so that the effect of diffusing the particles into the gas is enhanced.

Here, the opening ratio of the gas stirring plate 61 means, for example, a ratio of an area of the openings 63 to the total area of the plane 62*a* and the openings 63 in the plane view of FIG. 5.

The shape of each opening 63 of the gas stirring plate 61 is not particularly limited, and for example, the shape of the cross section perpendicular to the flow direction X of the gas can be polygonal, such as circular, elliptical, triangular, or quadrangular. Among these, the cross-sectional shape of each opening 63 is preferably circular.

The diameter of each opening 63 of the gas stirring plate 61 is not particularly limited, and it may be set as appropriate depending on the size of the gas stirring plate 61. Specifically, the diameter of each opening 63 in the gas stirring plate 61 may be a size enough to cause a gas backflow to form the recirculation flow.

As used herein, the diameter of each opening 63 of the gas stirring plate 61 means a diameter of each opening 63 in the cross section perpendicular to the flow direction X of the gas. When the cross-sectional shape of each opening 63 of the gas stirring plate 61 is not circular, the diameter of the largest inscribed circle inscribed in the cross-sectional shape is defined as the diameter of each opening 63 of the gas stirring plate 61.

The recirculation flow on the slip stream side of the gas stirring plate 61 is more likely to be formed as a flow velocity of the gas flowing through the introduction pipe 20 is higher (a flow rate is higher). Therefore, the flow rate of the gas is preferably from 500 to 20000 L/min.

The size of the gas stirring plate 61 is not particularly limited, and it may be appropriately adjusted depending on the size of the introduction pipe 20 in which the gas stirring plate 61 is arranged. For example, the outer diameter of the gas stirring plate 61 can correspond to the inner diameter of the introduction pipe 20.

Examples of the material used for the gas stirring plate 61 include metals, ceramics, and the like. Examples of the metals include stainless steel, titanium alloys, copper alloys, aluminum alloys, brass and the like. The material of the gas stirring plate 61 is preferably stainless steel because of its high durability and reliability.

A distance between the particle introduction portion 50 and the gas stirring portion 60 in the flow direction X of the gas is preferably 3 times or less, more preferably 2.5 times or less, the inner diameter of the introduction pipe 20 at the position where the gas stirring portion 60 is arranged. By controlling the distance between the particle introduction portion 50 and the gas stirring portion 60 to such a range, the particles can be stably introduced into the region where the recirculation flow is formed, so that the effect of diffusing the particles into the gas can be enhanced.

The gas (gas serving as a carrier for the particles) stirred by the gas stirring portion 60 includes, but not limited to, air, nitrogen, helium, hydrogen, and argon. Among them, the air is preferable from the viewpoint of cost and safety.

<Particle Concentration Adjusting Portion 70>

The particle concentration adjusting portion 70 is a member for adjusting the concentration distribution of the particles in the plane perpendicular to the flow direction X of the gas. The particle concentration adjusting portion 70 is disposed in the introduction pipe 20 on the downstream side of the particle introduction portion 50 in the flow direction X of the gas.

The particle concentration adjusting portion 70 is not particularly limited, but it is preferably a particle concentration adjusting plate.

Figure 7:
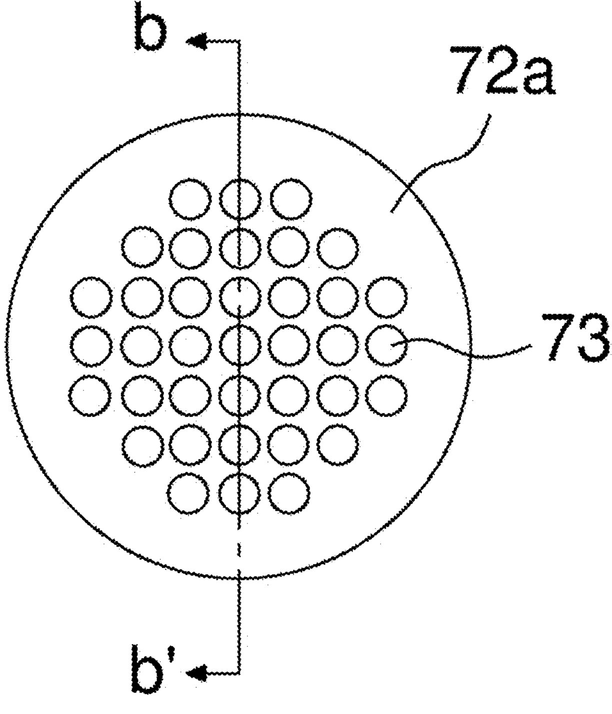
FIG. 7 is a plane view of a particle concentration adjusting plate used for an inspection device for a pillar shaped honeycomb filter according to an embodiment of the present invention.

Referring now to FIG. 7, it shows a plane view of a typical particle concentration adjusting plate (a plane view seen from the upstream side in the flow direction X of the gas). Further, FIG. 8 shows a cross-sectional view taken along the line b-b' in FIG. 7.

Figure 8:
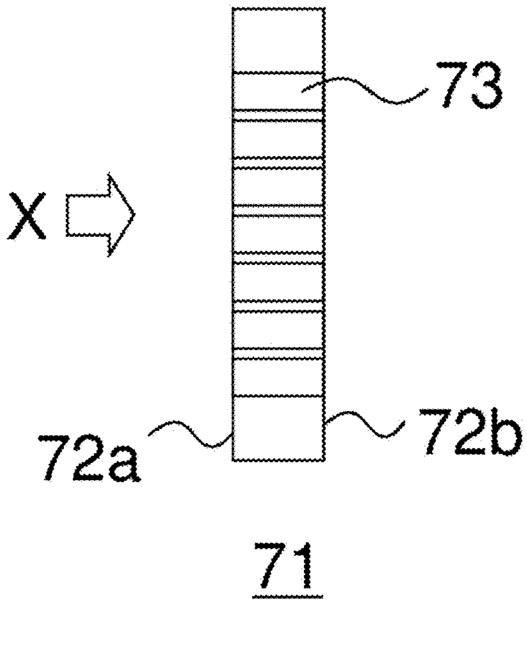
FIG. 8 is a cross-sectional view taken along the line b-b' of the particle concentration adjusting plate in FIG. 7.

As shown in FIGS. 7 and 8, the particle concentration adjusting plate 71 has a pair of flat surfaces 72*a*, 72*b* perpendicular to the flow direction X of the gas and has a plurality of openings 73 penetrating the pair of flat surfaces 72*a*, 72*b*.

By using the particle concentration adjusting plate 71 as the particle concentration adjusting portion 70, the concentration distribution of the particles in the plane perpendicular to the flow direction X of the gas can be adjusted, and any deviation in the concentration distribution of the particles in the plane perpendicular to the flow direction X of the gas can be suppressed, even if the length of the introduction pipe 20 on the downstream side of the gas stirring section 60 is shortened in the flow direction X of the gas. As a result, the particles can be uniformly fed to the pillar shaped honeycomb filter 1 to be inspected. Further, the particle concentration adjusting plate 71 has a simpler structure than a concentration adjusting device having various drive mechanisms, and does not require any external power, so that various costs can be reduced.

In the particle concentration adjusting plate 71, the plurality of openings 73 are preferably provided in a region on the inner peripheral side of the particle concentration adjusting plate 71. The provision of the plurality of openings 73 in such a region leads to easy adjustment of the concentration distribution of the particles in the plane perpendicular to the flow direction X of the gas.

As used herein, the inner peripheral side of the particle concentration adjusting plate 71 means a region from the center of the pair of flat surfaces 72*a*, 72*b* to ⅘ of the diameter (for example, the radius in the case of the disk shape) of the pair of flat surfaces 72*a*, 72*b*.

In the particle concentration adjusting plate 71, the opening ratio is preferably 30% or more, and more preferably 40 to 80%, and even more preferably 50 to 70%. By thus controlling the opening ratio, the concentration distribution of the particles in the plane perpendicular to the flow direction X of the gas can be stably adjusted.

As used herein, the opening ratio of the particle concentration adjusting plate 71 means a ratio of areas of the openings 73 to the total area of the plane 72*a* and the openings 73, for example, in the plane view of FIG. 7.

The shape of each opening 73 of the particle concentration adjusting plate 71 is not particularly limited, and for example, the shape of the cross section perpendicular to the flow direction X of the gas may be a polygon such as a circle, an ellipse, a triangle, or a quadrangle. Among these, the cross-sectional shape of each opening 73 is preferably circular.

The diameter of each opening 73 of the particle concentration adjusting plate 71 may be set as appropriate depending on the size of the particle concentration adjusting plate 71, but it may preferably be 10,000 to 200,000 times the average particle size of the particles generated in the particle generation portion 40. By controlling the diameter of each opening 73 within such a range, the concentration distribution of the particles in the plane perpendicular to the flow direction X of the gas can be easily adjusted.

As used herein, the diameter of each opening 73 of the particle concentration adjusting plate 71 means a diameter of each opening 73 in the cross section perpendicular to the flow direction X of the gas. When the cross-sectional shape of each opening 73 of the particle concentration adjusting plate 71 is not circular, the diameter of the largest inscribed circle inscribed in the cross-sectional shape is defined as the diameter of each opening 73 of the particle concentration adjusting plate 71.

It should be noted that the shape and diameter of each opening 73 of the particle concentration adjusting plate 71 may be different from or the same as the shape and diameter of each opening 63 of the gas stirring plate 61. By having the same shape and same diameter of each opening 73 of the particle concentration adjusting plate 71 as those of each opening 63 of the gas stirring plate 61, the particle concentration adjusting plate 71 and the gas stirring plate 61 will be easily manufactured.

The size of the particle concentration adjusting plate 71 is not particularly limited, and it may be adjusted as appropriate depending on the size of the introduction pipe 20 in which the particle concentration adjusting plate 71 is disposed. For example, the outer diameter of the particle concentration adjusting plate 71 can be made to correspond to the inner diameter of the introduction pipe 20.

Examples of the material used for the particle concentration adjusting plate 71 that can be used herein includes metals and ceramics. Examples of the metals include stainless steel, titanium alloys, copper alloys, aluminum alloys, and brass. The material of the particle concentration adjusting plate 71 is preferably stainless steel because of its high durability and reliability.

By using the particle concentration adjusting portion 70 (particle concentration adjusting plate 71) as described above, the length of the introduction pipe 20 on the downstream side of the gas stirring section 60 in the flow direction X of the gas can be shortened.

Specifically, a distance between the downstream end portion of the introduction pipe 20 and the particle introduction portion 50 in the flow direction X of the gas is preferably 5 to 10 times the diameter of the introduction pipe 20. More specifically, it is preferable that the distance between the downstream end portion of the introduction pipe 20 and the particle introduction portion 50 in the flow direction X of the gas is 1400 to 2600 mm. Such a distance allows the deviation in the concentration distribution of the particles in the plane perpendicular to the flow direction X of the gas to be suppressed, thereby uniformly and stably feeding the particles to the pillar shaped honeycomb filter 1 to be inspected.

<Particle Counters 80*a*, 80*b*>

The particle counters 80*a*, 80*b* are devices for measuring the number of particles in the gas flowing through the introduction pipe 20 and the discharge pipe 30. The particle counter 80*a* is arranged in the introduction pipe 20 on the downstream side of the particle introduction portion 50 in the flow direction X of the gas. Further, the particle counter 80*b* is arranged in the discharge pipe 30.

The particle counters 80*a*, 80*b* are not particularly limited as long as they can measure the number of particles contained in the gas. However, when inspecting the collection performance of the pillar shaped honeycomb filter 1 having a higher collection capacity, it is preferable to use particles having a smaller average particle diameter as described above. In order to measure such particles having a smaller average particle diameter, it is preferable to select particle counters 80*a*, 80*b* that can measure the number of particles having a particle diameter of 100 nm or more.

Examples of the particle counters 80*a*, 80*b* that can be used herein include an optical particle counter, a laser photometer, and a dust collector. Among them, the optical particle counter is preferably used. The use of the optical particle counter enables the number of particles to be easily and accurately measured. Since the optical particle counter is commercially available (e.g., KC-24 or KC-22B from RION Co., Ltd.), the commercially available product can be used as the particle counters 80*a*, 80*b*.

A distance between the particle introduction portion 50 and the particle counter 80*a* arranged in the introduction pipe 20 in the flow direction X of the gas may preferably be at least twice the inner diameter of the introduction pipe 20 at the position where the particle counter 80*a* is arranged. By arranging the particle counter 80*a* in such a range, the number of particles contained in the gas can be accurately measured.

Figure 9:
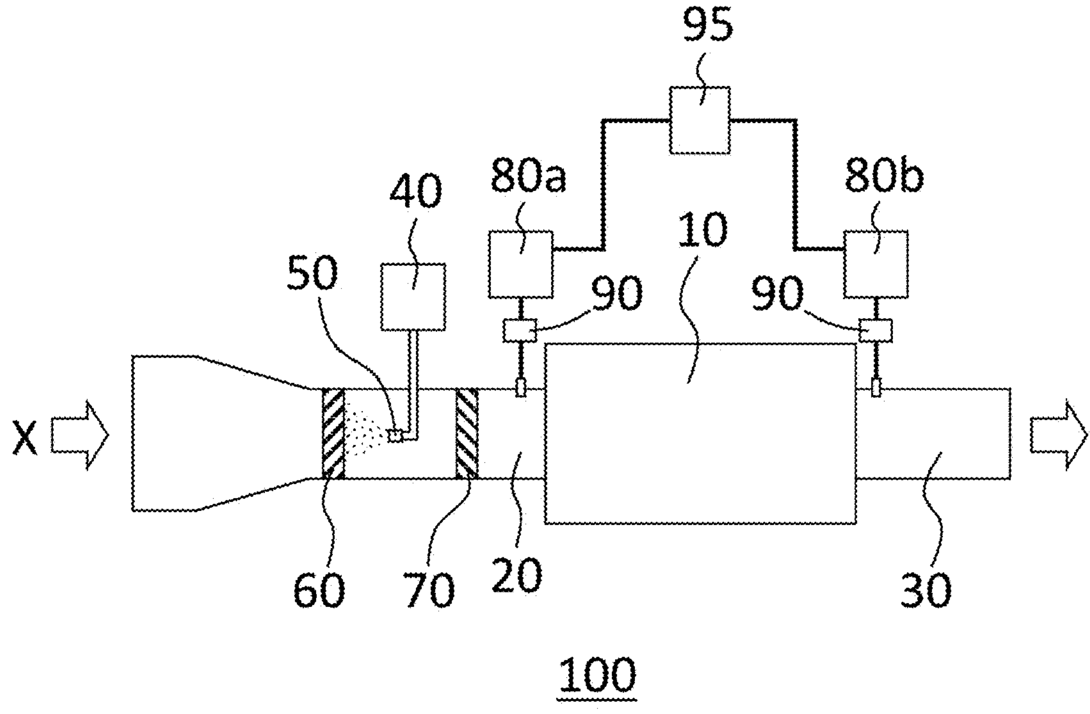
FIG. 9 is a schematic view of another inspection device for a pillar shaped honeycomb filter according to an embodiment of the present invention.

The inspection device 100 for the pillar shaped honeycomb filter 1 according to an embodiment of the present invention may optionally further include diluters 90 for adjusting the concentration of the particles, provided in the middle of a connection pipe for the introduction pipe 20 to the particle counter 80*a*, and in the middle of a connection pipe for connecting the discharge pipe 30 to the particle counter 80*b*, as shown in FIG. 9. Since the diluter 90 having such a function is commercially available (e.g., Model 3332 from TSI), the commercially available product can be used.

When the optical particle counters are selected as the particle counters 80*a*, 80*b*, it is desirable to reduce the concentration of the particles in the gas because the optical particle counter is easily contaminated by the particles. Therefore, the diluters 90 can be provided at the above positions, so that the concentration of particles can be adjusted, thereby suppressing contamination of the optical particle counter.

The diluters 90 preferably dilute the concentration of the particles in the gas by 2 to 1000 times. With such a dilution ratio, the contamination of the optical particle counter can be stably suppressed.

The inspection device 100 for the pillar shaped honeycomb filter 1 according to the embodiment of the present invention may optionally further include a calculation unit 95 for calculating a collection efficiency of particles based on the number of the particles measured by the particle counters 80*a*, 80*b* arranged in the introduction pipe 20 and the discharge pipe 30 as shown in FIG. 9. Examples of the calculation unit 95 having such a function include a computer and the like.

By providing such a calculation unit 95, the collection efficiency can be calculated in real time, so that the inspection can be rapidly performed.

(2) Inspection Method for Pillar Shaped Honeycomb Filter 1

An inspection method for the pillar shaped honeycomb filter 1 according to an embodiment of the present invention includes: a particle generation step (S1); a particle introduction step (S2); a particle concentration adjusting step (S3); a particle feed step (S4); and a particle measurement step (S5). By performing these steps, the inspection of the collection performance of the pillar shaped honeycomb filter 1 can be carried out in a compact environment, and the inspection accuracy of the collection performance can be improved. This inspection method can be performed using the inspection device 100 for the pillar shaped honeycomb filter 1 as described above.

The particle generation step (S1) is a step of generating particles. This step can be carried out by activating the particle generation portion 40 in the inspection device 100 for the pillar shaped honeycomb filter 1.

The particle introduction step (S2) is a step of introducing the particles generated in the particle generation step (S1) into the gas stirred by the gas stirring portion 60. This step can be carried out by using the particle introduction portion 50 in the inspection device 100 for the pillar shaped honeycomb filter 1 to introduce the particles generated by the particle generation portion 40 into the introduction pipe 20. By introducing the particles into the gas by such a method, the particles are easily diffused into the gas, so that the deviation of the concentration distribution of the particles can be suppressed.

A direction of the particles introduced in the particle introduction step (S2) preferably has an angle θ of more than 90° relative to the flow direction X of the gas. By controlling the introduction direction of the particles in such a method, the particles are more easily diffused into the gas, so that the effect of suppressing the deviation of the concentration distribution of the particles in the plane perpendicular to the flow direction X of the gas can be enhanced.

The particle concentration adjusting step (S3) is a step of adjusting the concentration of the particles in the gas. This step is carried out by passing a gas having the introduced particles through the particle concentration adjusting plate 71 having the pair of planes 72*a*, 72*b* perpendicular to the gas flow direction and having the plurality of openings 73 penetrating the pair of planes 72*a*, 72*b*, in the inspection device 100 for the pillar shaped honeycomb filter 1. By thus adjusting the concentration of the particles, the concentration distribution of the particles in the plane perpendicular to the flow direction X of the gas can be adjusted, and the deviation in the particle concentration distribution in the plane perpendicular to the flow direction X of the gas can be suppressed, even if the length of the introduction pipe 20 is shortened.

The particle feed step (S4) is a step of feeding the gas having the adjusted concentration of the particles to the pillar shaped honeycomb filter 1. Since the particles in the gas fed to the pillar shaped honeycomb filter 1 have the suppressed deviation of the concentration distribution, the amount of particles fed in the pillar shaped honeycomb filter 1 can be made uniform. As a result, even if the direction of the pillar shaped honeycomb filter 1 and the arrangement method are different, it will be difficult for measured values to vary, so that the inspection accuracy of the collection performance is improved.

The particle measurement step (S5) is a step of measuring the number of particles in the gas on the upstream side and on the downstream side of the pillar shaped honeycomb filter 1 in the flow direction X of the gas. This step is carried out using the particle counters 80*a*, 80*b* in the inspection device 100 for the pillar shaped honeycomb filter 1.

The inspection method for the pillar shaped honeycomb filter 1 according to the embodiment of the present invention may optionally further include diluting the concentration of the particles in the particle measurement step (S5). The concentration of the particles is diluted using the diluters 90 in the inspection device 100 for the pillar shaped honeycomb filter 1.

For the diluting of the particle concentration, the concentration of the particles in the gas is preferably diluted by 2 to 1000 times as described above. This step can allow the concentration of the particles to be adjusted, so that any contamination of the optical particle counters is suppressed.

The inspection method for the pillar shaped honeycomb filter 1 according to the embodiment of the present invention may optionally further include a collection efficiency calculation step (S6) for calculating the particle collection efficiency from the number of particles obtained in the particle measurement step (S5). The collection efficiency can be calculated by the following equation:

Collection efficiency [%]=(number of particles in gas on upstream side of pillar shaped honeycomb filter 1−number of particles in gas on downstream side of pillar shaped honeycomb filter 1)/number of particles in gas on upstream side of pillar shaped honeycomb filter 1×100.

The collection efficiency calculation step (S6) can be carried out after the particle measurement step (S5), and is carried out using the calculation unit 95 in the inspection device 100 for the pillar shaped honeycomb filter 1. This step can allow the collection efficiency to be calculated in real time, enabling rapid inspection.

EXAMPLES

Hereinafter, the present invention will be described in more detail with reference to Example, but the present invention is not limited to the Example.

Example 1

An inspection device having the structure shown in FIG. 1 was produced as an inspection device for a pillar shaped honeycomb filter having a diameter of about 330 mm. In this inspection device, a gas stirring plate and a particle concentration adjusting plate were used as the gas stirring portion and the particle concentration adjusting portion. Further, the detailed conditions of this inspection device were as follows:

- Diameter of the introduction pipe (the portion where the gas stirring plate and the particle concentration adjusting plate are placed): about 261 mm;
- Distance between the particle introduction portion disposed in the introduction pipe and each particle counter (optical particle counter): about 2000 mm;
- Formed region of the openings of the gas stirring plate: a region from the outer periphery of the flat surface of the gas stirring plate to ⅖ of the diameter of the flat surface;
- Shape of each opening of the gas stirring plate (a shape of the cross section perpendicular to the flow direction X of the gas): a circle with a diameter of about 24 mm;
- Opening ratio of the gas stirring plate: about 19%;
- Formed region of the openings of the particle concentration adjusting plate: a region from the center of the plane of the particle concentration adjusting plate to ⅘ of the diameter of the plane;
- Shape of each opening of the particle concentration adjusting plate (a shape of the cross section perpendicular to the flow direction X of the gas): a circle with a diameter of about 24 mm; and
- Opening ratio of the particle concentration adjusting plate: about 35%.

Comparative Example 1

An inspection device having the same structure as that of Example 1 was produced, with the exception that the particle concentration adjusting plate was not disposed and the gas stirring plate was changed to one having the following conditions:

- Formed region of the openings of the gas stirring plate: a region from the outer periphery of the flat surface of the gas stirring plate to ½ of the diameter of the flat surface;
- Shape of each opening of the gas stirring plate (a shape of the cross section perpendicular to the flow direction X of the gas): a circle with a diameter of about 24 mm; and
- Opening ratio of the gas stirring plate: about 34%.

Figure 10:
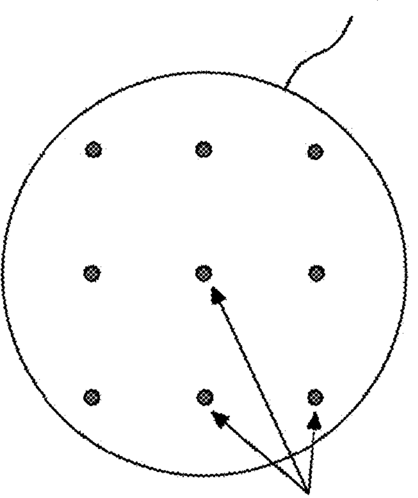
FIG. 10 is a cross-sectional view of an introduction pipe for explaining a measurement position of particles within the introduction pipe in Example.

In the inspection devices produced in Example 1 and Comparative Example 1, an air containing particles having an average particle size of 200 nm was generated in the particle generation portion and introduced into the introduction pipe from the particle introduction portion. The direction of the particles introduced in the particle introduction portion was set at an angle of 180° with respect to the gas flow direction. Further, the concentration of the particles in the air was 500 to 1000 particles/cm$^3$, and the flow rate of the air flowing through the introduction pipe was 15000 L/min (a flow velocity was about 4.5 m/sec). Then, using the particle counters disposed in the introduction pipe, the number of the particles in the air was measured at nine positions (FIG. 10) in the cross section of the introduction pipe perpendicular to the flow direction X of the gas.

As a result of the above measurements, we found that in the inspection device according to Example 1, the number of the particles varied only by −1.1 to 1.0% based on the average value of the measurement results at nine positions, and the particle concentration distribution in the plane perpendicular to the gas flow direction was smaller. On the other hand, in the inspection device according to Comparative Example 1, the variation was −6.9 to 8.0% based on the measurement position at the center of the cross section of the introduction pipe.

As can be seen from the above results, according to the present invention, it is possible to provide an inspection device which has higher inspection accuracy of collection performance and can be downsized. Also, according to the present invention, it is possible to provide an inspection method for a pillar shaped honeycomb filter, which has higher inspection accuracy of collection performance and can be implemented in a compact environment.

DESCRIPTION OF REFERENCE NUMERALS

1 pillar shaped honeycomb filter
2 outer peripheral wall
**3*a*** first end face
**3*b*** second end face
**4*a*** first cell
**4*b*** second cell
5 partition wall
6 plugged portion
10 housing portion
20 introduction pipe
30 discharge pipe
40 particle generation portion
50 particle introduction portion
60 gas stirring portion
61 gas stirring plate
**62*a*, 62*b*** plane
63 opening
70 particle concentration adjusting portion
71 particle concentration adjusting plate
**72*a*, 72*b*** plane
73 opening

80*a*, 80*b* particle counter
90 diluter
95 calculation unit
100 inspection device
X gas flow direction

The invention claimed is:

1. An inspection device for a pillar shaped honeycomb filter, wherein the inspection device comprises:
   a housing portion that can house a pillar shaped honeycomb filter;
   an introduction pipe and a discharge pipe through which a gas can flow, each of the introduction pipe and the discharge pipe being connected to the housing portion;
   a particle generation portion for generating particles;
   a particle introduction portion for introducing the particles generated by the particle generation portion into the introduction pipe;
   a gas stirring portion disposed in the introduction pipe on an upstream side of the particle introduction portion in a flow direction of the gas; and
   a particle concentration adjusting portion disposed in the introduction pipe on a downstream side of the particle introduction portion in the flow direction of the gas; and
   particle counters for measuring the number of particles, the particle counters being disposed in the introduction pipe and the discharge pipe on the downstream side of the particle introduction portion in the flow direction of the gas.

2. The inspection device for a pillar shaped honeycomb filter according to claim 1, wherein the particle concentration adjusting portion is a particle concentration adjusting plate having a pair of planes perpendicular to the flow direction of the gas and having a plurality of openings penetrating the pair of planes.

3. The inspection device for a pillar shaped honeycomb filter according to claim 2, wherein the openings of the particle concentration adjusting plate are provided in a region from a center of each of the planes to ⅘ of a diameter of each of the planes.

4. The inspection device for a pillar shaped honeycomb filter according to claim 2, wherein the particle concentration adjusting plate has an opening ratio of 30% or more.

5. The inspection device for a pillar shaped honeycomb filter according to claim 2, wherein a diameter of each of the openings of the particle concentration adjusting plate is 10,000 to 200,000 times an average particle size of the particles.

6. The inspection device for a pillar shaped honeycomb filter according to claim 1, wherein a distance between a downstream end portion of the introduction pipe and the particle introduction portion in the flow direction of the gas is 5 to 10 times the diameter of the introduction pipe.

7. The inspection device for a pillar shaped honeycomb filter according to claim 1, wherein the introduction pipe has a diameter of 150 to 270 mm.

8. The inspection device for a pillar shaped honeycomb filter according to claim 1, wherein a distance between the downstream end portion of the introduction pipe and the particle introduction portion in the flow direction of the gas is 1400 to 2600 mm.

9. The inspection device for a pillar shaped honeycomb filter according to claim 1, wherein the pillar shaped honeycomb filter has a diameter of 90 to 356 mm.

10. The inspection device for a pillar shaped honeycomb filter according to claim 1, wherein the gas stirring portion is a gas stirring plate having a pair of planes perpendicular to the flow direction of the gas and having a plurality of openings penetrating the pair of planes, wherein the openings of the gas stirring plate are provided in a region from an outer periphery of each of the planes to ½ of the diameter of each of the planes.

11. The inspection device for a pillar shaped honeycomb filter according to claim 10, wherein the gas stirring plate has an opening ratio of 5 to 50%.

12. The inspection device for a pillar shaped honeycomb filter according to claim 1, further comprising a calculation unit for calculating a collection efficiency of the particles based on the number of particles measured by the particle counters disposed in the introduction pipe and the discharge pipe.

13. The inspection device for a pillar shaped honeycomb filter according to claim 1, wherein the particles are one or more selected from soot particles, carbon particles, oil particles, NaCl particles, and resin particles.

14. An inspecting method for a pillar shaped honeycomb filter, wherein the method comprises:
   a particle generation step of generating particles with a particle generation portion;
   a particle introduction step of introducing, with a particle introduction portion, the particles generated in the particle generation step into a gas stirred by a gas stirring portion;
   a particle concentration adjusting step of adjusting a concentration of particles in the gas, with a particle concentration adjusting portion;
   a particle feed step of feeding the gas having the adjusted concentration of the particles to the pillar shaped honeycomb filter; and
   a particle measurement step of measuring, with an upstream side particle counter and a downstream side particle counter, the number of particles in the gas on an upstream side and a downstream side of the pillar shaped honeycomb filter in a flow direction of the gas,
   wherein, in the particle introduction step, the particles generated in the particle generation step are introduced into the gas in a direction opposing the flow direction of the gas.

15. The inspection method for a pillar shaped honeycomb filter according to claim 14, wherein the particle concentration adjusting step is carried out by passing the gas having the introduced particles through a particle concentration adjusting plate having a pair of planes perpendicular to the flow direction of the gas and having a plurality of openings penetrating the pair of planes.

16. The inspection method for a pillar shaped honeycomb filter according to claim 15, wherein the openings of the particle concentration adjusting plate are provided in a region from a center of each of the planes to ⅘ of a diameter of each of the planes.

17. The inspection method for a pillar shaped honeycomb filter according to claim 15, wherein the particle concentration adjusting plate has an opening ratio of 30% or more.

18. The inspection method for a pillar shaped honeycomb filter according to claim 15, wherein a diameter of each of the openings of the particle concentration adjusting plate is 10,000 to 200,000 times an average particle size of the particles.

19. The inspection method for a pillar shaped honeycomb filter according to claim 14, further comprising a collection efficiency calculation step of calculating a collection efficiency of the particles from the number of the particles obtained in the particle measurement step.

20. The inspection method for a pillar shaped honeycomb filter according to claim 14, wherein the particles are one or more selected from soot particles, carbon particles, oil particles, NaCl particles, and resin particles.

* * * * *